United States Patent [19]

Ibuka et al.

[11] 3,859,828
[45] Jan. 14, 1975

[54] LOCK MEANS FOR THE STEERING HANDLE SHAFT OF AN AUTOMOBILE

[75] Inventors: Ibuka; Shinya Ito; Takehiko Nishikawa, all of Aichi, Japan

[73] Assignee: Kabushiki-Kaisha Tokai-Rika-Denki-Seisakusho, Aichi-Pref., Japan

[22] Filed: Mar. 2, 1973

[21] Appl. No.: 337,408

[30] Foreign Application Priority Data
Mar. 11, 1972 Japan.............................. 47-25136

[52] U.S. Cl.................................. 70/252, 180/114
[51] Int. Cl........................................... B60r 25/02
[58] Field of Search ............... 70/186, 252; 180/114

[56] References Cited
UNITED STATES PATENTS

| | | | |
|---|---|---|---|
| 3,490,255 | 1/1970 | Wight et al. ......................... | 70/252 |
| 3,680,335 | 8/1972 | Onishi................................. | 70/252 |
| 3,680,656 | 8/1972 | Leger.................................. | 180/114 |
| 3,688,861 | 9/1972 | Lipschultz et al. ................. | 180/114 |
| 3,708,032 | 1/1973 | Suzuki ................................ | 180/114 |

Primary Examiner—Albert G. Craig, Jr.

[57] ABSTRACT

In a lock means for the steering handle shaft of an automobile, comprising a lock releasing member rotatable between a lock position and a starter driving position of the steering handle shaft together with a cylinder lock, and a lock member for locking the steering handle shaft incident to the rotation of said lock releasing member, means is provided by which the lock releasing member is held against rotation to the lock position of the steering handle shaft other than when the steering handle shafts needs to be locked.

1 Claim, 9 Drawing Figures

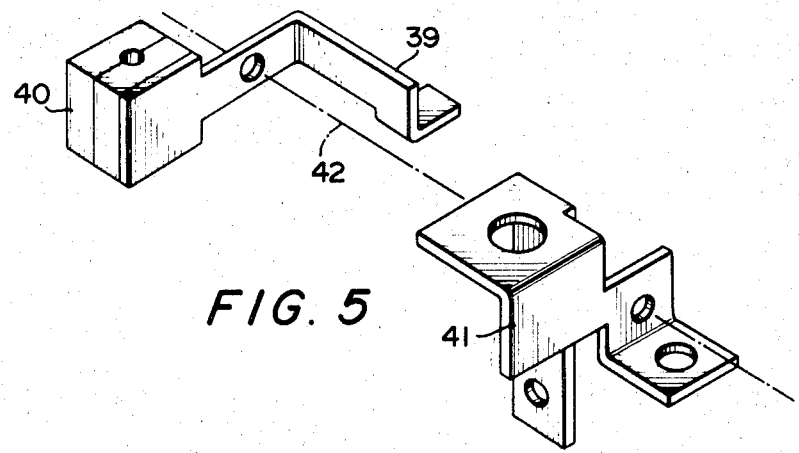
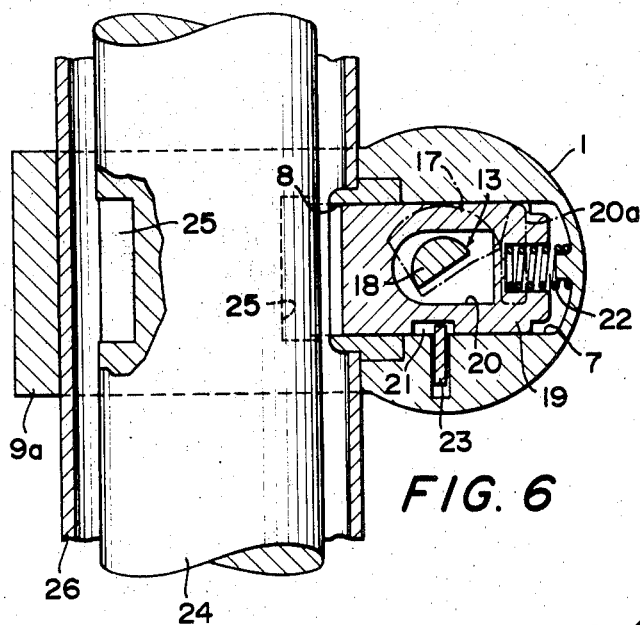
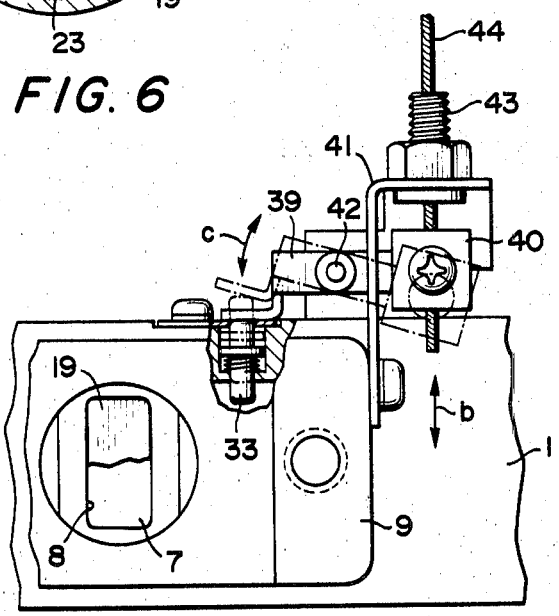

3,859,828

LOCK MEANS FOR THE STEERING HANDLE SHAFT OF AN AUTOMOBILE

The present invention relates to lock means for the steering handle shaft of an automobile.

Lock means for the steering handle shaft of an automobile, comprising a lock releasing member making a reciprocal rotary motion along with a rotary member of a cylinder lock device which controls the on-off operation of an ignition switch and a lock member for locking the steering handle shaft against rotation by engaging said steering handle shaft incident to the rotation of said lock releasing member, is known. With such prior art means, there is the danger that, when an automobile encounters an unpredictable casual accident during travel, a rotary member of the starter switch rotates to a lock position of the steering handle shaft along with the lock releasing member and the key moves off from the starter switch. In this case, the engine stops but at the same time, the steering handle shaft is locked and steering of the automobile becomes impossible. The automobile will naturally coast straight forward by inertia and run into an obstacle which may exist in its way. Thus, there is the large possibility of serious accident.

It is, therefore, an object of the present invention to provide a lock means for the steering handle shaft of an automobile, comprising a lock releasing member rotatable between a lock position and a starter driving position of the steering handle shaft along with a cylinder lock (cooperating with a starting switch) and a lock member for locking the steering handle shaft incident to the rotation of said lock releasing member, characterized in that means is provided by which the lock releasing member is fixed in the releasing position so as not to allow the lock member to shift to the steering handle shaft locking position other than when said shaft needs to be locked.

Other objects and features of the invention will become apparent from the following description of embodiments of the invention when taken in conjunction with the accompanying drawings, in which:

FIG. 5 is a perspective view showing an operating lever for the pin and a bracket for mounting said lever;

FIG. 6 is a sectional view taken on the line A—A of FIG. 1;

FIG. 7 is a fragmentary side view, partially in section, of the locking means;

Figure 1:
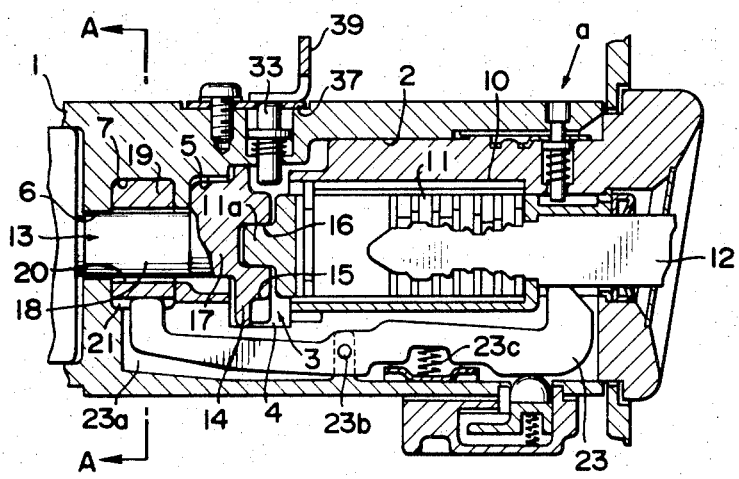
FIG. 1 is a sectional view of lock means of the invention.

As shown in FIG. 1, the lock means for the steering handle shaft according to the present invention has a housing *a* of which a cylindrical portion 1 is formed therein in the axial direction thereof with a bore 2 for receiving a cylinder lock and a bore 3 for receiving a control member 13 for lock means for the steering handle shaft. The bore 3 consists of a large diameter portion 4, an intermediate diameter portion 5 and a small diameter portion 6 which are arranged sequentially stepwise. The cylindrical portion 1, as shown in FIG. 6, is further formed therein with a lateral bore 7 at righ angles to the small diameter portion 6, for slidably supporting a lock member 19 therein, the outer end opening 8 of said lateral bore 7 being open in the outer surface of the cylindrical portion 1. Brackets 9 are formed integrally on the outer surface of the cylindrical portion 1, each on each side of the opening 8. The housing *a* is secured to a covering sleeve 26 of the steering handle shaft 24 between these brackets 9 by the cooperation of opposite members 9a. In the bore 2 of the cylindrical portion 1 of the housing *a* is disposed a cylinder lock means which is rotated by a key 12 and has a rotary member 11.

In the stepped bore 3 is disposed rotatably a lock releasing member 13 as shown in FIGS. 1 and 6. The lock releasing member 13 has a head portion 14, a cam portion 17 and a journal portion, all of which are formed integrally with each other. The head portion 14 is located in the large diameter portion 4, the cam portion 17 in the intermediate diameter portion 5 and the cam portion 18 in the small diameter portion 6, respectively for rotation therein. The inner end of the head portion 14 is provided with a projection 15 which is smaller in diameter than the head portion 14, and said projection 15 is provided with a rectangular recess 16 in which a rectangular projection 11a formed at the rear end of the rotary member 11 is received to rotate the lock releasing member 13 through said rotary member 11 when the key 12 is rotated.

Figure 2:
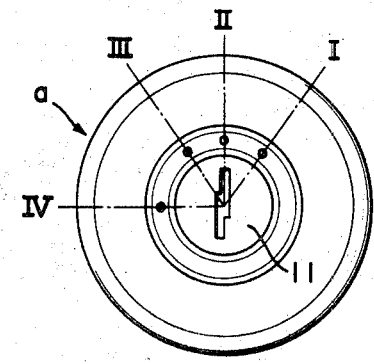
FIG. 2 is a plan view of only the forward end portion of the lock means shown in FIG. 1.
Figure 3:
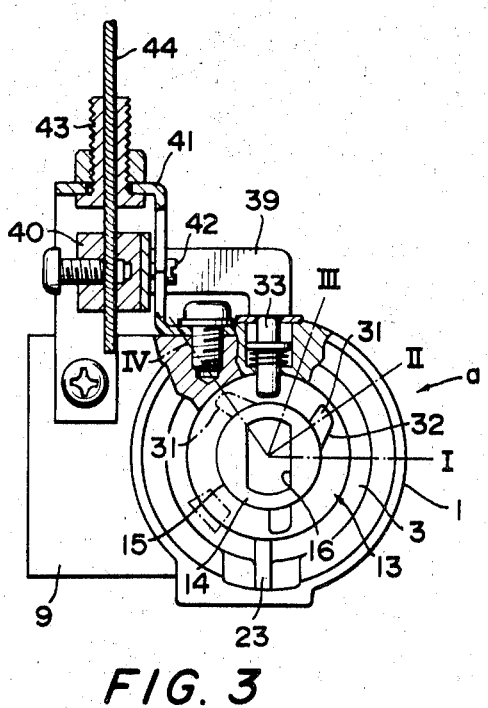
FIG. 3 is a plan view, partially in section, of the front face of the lock means, with the cylinder lock removed.

The rear end of the lock releasing member 13 which rotates along with the rotary member 11, is connected with a contact holder (not shown) of an ignition switch to control the operation of said ignition switch. The rotary member 11 of the lock 10 and the lock releasing member 13 can take each of a starter driving position I, an engine "on" position II, a radio receiving position III and a steering handle locking position IV, as shown in FIGS. 2 and 3. The key 12 can be inserted or pulled off only when it is in the steering handle locking position.

In the lateral bore 7 is inserted reciprocably slidably the lock member 19 for the steering handle shaft 24 as stated above and shown in FIGS. 1 and 6. The lock member 19 is constantly urged toward the steering handle shaft 24 by a spring 22 disposed between the rear end of said member 19 and the bottom of said lateral bore 7. When the lock member 19 is pushed by the spring, its outer end protrudes outwardly from the opening 8 and received in a peripheral notch 25 formed in the peripheral surface of the steering handle shaft 24, to lock said shaft 24 unrotatably. The lock member 19 is formed with an opening 20 through which the journal portion 18 is inserted. Further, the lock member 19 is provided with a cam follower 20a which is extending in the axial direction of the housing 1 up to the intermediate diameter portion 5 of the bore 3. This cam follower 20a cooperates with the cam portion 17 of the lock releasing member 13. In the state shown in FIG. 6 wherein the key 12 is in the position II of FIG. 2, the locking member 19 is displaced to the rightward position against the biasing force of the spring 22 by the cam portion of the lock releasing member 13, When the key 12 is rotated to the position IV of FIG. 2, the cam portion 17 in FIG. 6 is rotated in a counterclockwise direction and the cam surface thereof is disengaged from the cam follower and the lock member 19 is moved to the left by the spring 22 and engaged in one of notches 25 formed in the outer surface of the steering handle shaft 24 to lock said shaft 24.

As shown in FIG. 1, a longitudinally extending slit 23a is formed in the bottom portion of the housing 1 and a latch lever 23 is mounted in said slit for pivotal movement therein about a pivot 23b. One end of the latch lever 23 is projected into a key hole of the cylinder lock 10 by a spring 23c and the other end thereof extends up to a position engageable with a lateral groove 21 formed in the bottom surface of the lock member 19. When the key 12 is inserted into the lock 10 as shown in FIG. 1, the aforesaid one end of the latch lever 23 is pushed by said key, with the other end thereof being engaged in the lateral groove 21. When the other end of the latch lever 23 is being engaged in the lateral groove as stated above, the lock member 19 is kept immovably in its retracted position. Therefore, the lock member 19 will not be engaged in the notch 25 of the steering handle shaft 24, unless the key 12 is pulled off.

Figure 4:
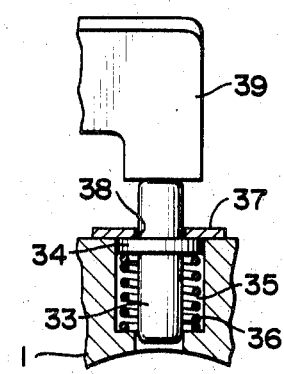
FIG. 4 is a sectional view showing in an enlarged scale only a pin for restricting a lock operation for the steering handle shaft, in the lock means.

As stated previously, it is possible that, during travel of the automobile, the rotary member 11 and the lock releasing member 13 are rotated to the locking position IV due to a casual accident and the key 12 moves off, with the result that the other end of the latch lever 23 is disengaged from the lateral groove 21 of the lock member 19 and said lock member 19 engages in the notch of the steering handle shaft 24 thereby locking said shaft 24. The present invention intends to prevent such accidental shifting of the lock member 19 to the lock position. To this end, in the present invention a stopper 31 is provided on the lock releasing member 13 and a retractable pin 33 is disposed in the housing 1 for cooperation with said stopper (FIGS. 1 and 3). The pin 33 is disposed vertically reciprocably in a cavity 35 formed in the peripheral wall of the housing 1 so that the lower end thereof may be projected into the bore 4 through an opening at the bottom of the cavity 35 up to a point close to the outer surface of the reduced portion 15 of the head portion 14 of the lock releasing member 13. As shown in FIG. 4, the pin 33 has a flange 34 and is constantly urged upwardly by a spring 36 disposed between said flange 34 and the bottom of the recess 35. The upper end of the recess or cavity 35 is closed by a cover plate 37 fixed to the upper peripheral portion of the housing 1. The pin 33 can project upwardly through an opening 38 formed in the cover plate 37. The diameter of the opening 38 is smaller than that of the flange 34 and, therefore, the pin 33 is prevented from moving off the cavity 35 by the plate 37.

The stopper 31 which will be brought into abutting engagement with the pin 33 is formed projecting from the outer surface of the reduced portion 15 of the head portion of the lock releasing member 13 as shown in FIG. 3. This stopper 31 is provided at such location that it will abut against the pin 33 and thereby hold the lock releasing member 13 against rotation to the lock position IV when said pin 33 is projecting into the bore 4.

As shown in FIGS. 1, 3 and 4, a press lever 39 is disposed above the housing 1 to depress the pin 33 and thereby project the lower end of said pin into the bore 4 for engagement with the stopper 31. The press lever 39 has the shape shown in FIGS. 5 and 7, and is disposed on a bracket 41, fixed to the peripheral surface of the housing 1 and the brackets 9, in a manner to be rotatable about a pivot 42 so that the end of its angle shape will contact the upper end of the pin 33. To the other end of the lever 39 is connected an operating wire 44 by means of a clamp 40. The wire 44 extends through a guide sleeve 43 fixed to the bracket 41. When the wire 44 is pulled by a preferable driving source, the lever 39 operates in a counterclockwise direction as viewed in FIG. 7, depressing the pin 33 against the extensive force of the spring 36. When the pulling force is removed from the wire 44, the pin 33 returns to its upward position under the biasing force of the spring 36. The wire 44 is reciprocated as indicated by the arrows b and the lever 39 is pivotally reciprocated as indicated by the arrows c in FIG. 7.

According to the present invention, the press lever 39 for projecting the pin 33 into the operating range of the stopper 31 is provided so as to hold the rotary member 11 of the lock 10 and the member 13 releasing the lock of the steering handle shaft against rotary displacement to the position in which the key 12 can be pulled off, or the position in which the steering handle shaft 24 is locked, other than when said steering handle shaft needs to be locked. In view of the foregoing, a force for depressing the pin 33 is always imparted to the press lever 39 from the preferable driving source. Spring means as shown in FIG. 8 is preferable as the driving source and an example thereof is shown in FIG. 8.

Figure 8:
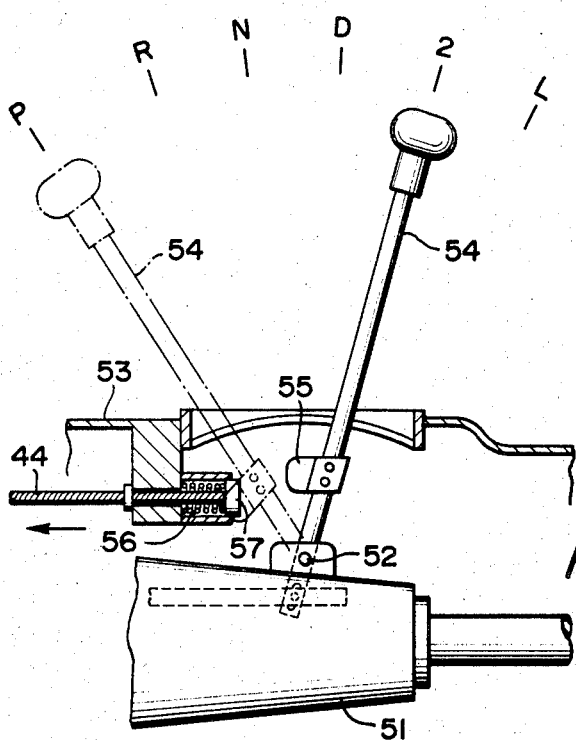
FIG. 8 is a side view showing a shift lever of a torque converter adapted for use with the lock means of the invention.

As shown in FIG. 8, a floor shift lever 54 which is pivotally supported by a pivot 52 on a casing 51 of a torque converter usually mounted on an automobile, is projecting above the automobile floor 53. This lever 54 is shifted to each of a parking position P, a backward (rear) running position R, a neutral position N, a drive running position D, a second speed running position 2 and a low speed running position L. In the parking position, the propeller shaft is locked unrotatably. Therefore, the shift lever 54 is naturally shifted to this parking position when the automobile is parked. Therefore, it is convenient for the automatic locking of the handle shaft lock releasing, to associate the shifting movement of the shift lever 54 with the locking and lock releasing operations of the steering handle shaft.

A press member 55 is attached to the portion of the shift lever 54 below the floor 53. On the underside of the floor 53, a spring 56 is disposed in a spring supporting casing, by which an end piece 57 fixed to one end of the wire 44 is pulled constantly to the right. Therefore, the wire 44 is always pulled to the right as viewed in FIG. 8 and the press lever 39 is held in the position indicated by the solid line in FIG. 7, when the shift lever 54 is in one of the positions other than the parking position P and the press member 55 is not in contact with the end piece of the wire 44. Under such condition, the restricting pin 33 is depressed downwardly and projected into the operating range of the stopper 31 provided on the head portion 14 of the lock releasing member 13. When the restricting pin 33 is projecting into the operation range of the stopper 31 as described, the lock releasing member 13 is not displaceable angularly to the position to allow the lock member 19 to shift toward the steering handle shaft 24. The steering handle shaft, therefore, will not be locked even if an accident occurs and as a result, the key 12 is displaced angularly to the position IV shown in FIG. 2 and moves off the cylinder lock means 10. It is important to note here that the spring 56 is considerably stronger in expansion power than the spring 36. Namely, the spring 56 is required to have an expansion power strong enough to compress the spring 36 and thereby to pull the wire 44 upwardly as viewed in FIG. 7 or to the right as viewed in FIG. 8 up to the position of its operating limit.

In the embodiment shown in FIG. 8 of the invention, the wire 44 is pulled to the left by the spring 36 through the press lever 39 when the end piece 57 fixed to the end portion of said wire 44 is pushed to the left by the press member 55 during shifting of the shift lever 54 to the parking position. The restricting pin 33 in this state is displaced upwardly as shown in FIG. 4 and retracted from the operating range of the stopper 31 of the lock releasing member 13. The lock member 19 is engageable with one of the notches of the steering handle shaft 24 by the angular displacement of the lock releasing member 13 to the position IV caused by the key 12, at any time after the pin 33 has been retracted outside the operating range of the stopper 31.

In the embodiment described above, the retractive movement of the pin 33 is controlled by the shift lever 54. However, it is to be understood that a hand brake may be used in lieu of the shift lever 54. The hand brake is also operated incident to the shifting operation of the shift lever to the parking position P when the automobile is parked. If the end piece 57 is pressed by the hand brake when said hand brake is operated, the steering handle shaft will be locked in exactly the same manner as described above.

Figure 9:
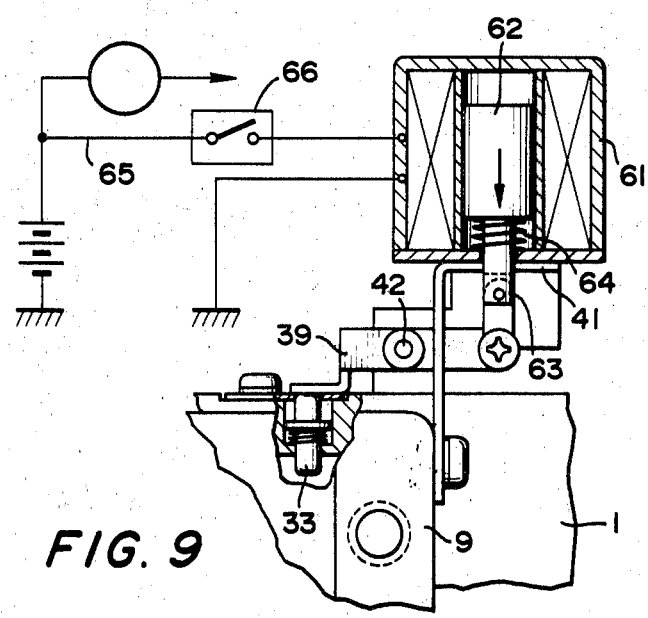
FIG. 9 is a side view, partially in section, showing another form of the restricting pin operating means.

Another embodiment of the invention is shown in FIG. 9. In this embodiment, an electric solenoid means is used in lieu of the shift lever or the hand brake in the preceding embodiment.

As shown in FIG. 9, a solenoid coil 61 is fixedly mounted on the bracket 41, and an armature plunger 62 is disposed in the central space of said solenoid coil 61 in a manner to be movable along the axis of said coil. The armature plunger 62 has a connecting rod 63 fixed to the lower end thereof. The connecting rod 63 is pivotally connected to the outer end of the press lever 39. Between the lower end of the plunger 62 and the bottom part of a solenoid housing is disposed a spring 64 which urges the plunger 62 constantly upwardly. The armature plunger 62 is held in its upward position by the action of the spring 64 as shown in FIG. 9 when the solenoid coil 61 is not energized. The solenoid coil 61 is connected by a lead 65 to a battery usually mounted on the automobile. A switch 66 is connected in series to this solenoid coil circuit, which is always in an "off" position during travel of the automobile. Since the switch 66 is in the "off" position as shown, the solenoid coil 61 during travel of the automobile is held deenergized and the armature plunger 62 is held in its upward position by the action of the spring 64.

The upward movement of the armature plunger 62 causes the press lever 39 to make angular displacement in a counterclockwise direction as viewed in FIG. 9 through the connecting rod 63. When the press lever 39 makes angular displacement in the counterclockwise direction, its operating end depressed the restricting pin 33 to locate it in the operating range of the stopper 31 of the lock releasing member 13. This state is shown in FIG. 9. When the restricting pin 33 has thus been projected downwardly, the lock releasing member 13 is no longer rotatable to the position IV (FIG. 2) as stated previously, so that the lock member 19 will not be allowed to displace or shift to the lock position even if the key 12 accidentally moves off.

The switch 66 is placed in an "on" position when the automobile is parked, so that the solenoid coil 61 is energized and the armature plunger 62 is forced downwardly. The connecting rod 63 depressed the outer end of the press lever 39 when the plunger 62 is forced downwardly. By this depression, the press lever 39 is caused to make angular displacement in a counterclockwise direction as viewed in FIG. 9 and the restricting pin 33 is moved upwardly by the spring 36. Thus, the lock releasing member 13 allows the lock member 19 to shift to the lock position.

It is to be understood that a switch operated by a hand brake bar may be used in lieu of the switch 66 which is in the "off" position during travel of the automobile and in the "on" position during parking of the automobile.

In an automobile provided with the torque converter, the starter switch normally can be placed in the "on" position by the key while the shift lever is in the parking position P or the neutral position N. There may be the occasion wherein the key is turned to the position I and the engine is started even when the pin 33 is held in the operating range of the stopper 31 by the shift lever or hand brake. In such occasion, the stopper 31 is required to be operated to a position corresponding to the position I upon forcibly pushing the pin 33 upwardly. For this reason, the backside of the stopper 31 is shaped to provide a gentle inclined surface 32. With such inclined surface 32, the stopper 31 can shift easily from the position IV toward the position I, so that the engine can be started from the parked condition, even tough the shift lever or the hand brake is interlocked with the restricting pin 33.

It will be obvious that other embodiments of the invention are possible in addition to those described herein without deviating from the scope of the invention.

We claim:
1. A lock means for a steering handle shaft of an automobile, comprising a housing, a lock releasing member in said housing rotatable reciprocally between a lock position and a starter actuating position along with a rotary member of a cylinder lock, a lock member operating in association with the operation of said lock releasing member to lock the steering handle shaft, means for holding said rotary member and said lock releasing member against rotation to the lock position for the steering handle shaft other than when the automobile is parked, means for maintaining said holding means in the state of holding said rotary member and said lock releasing member against rotation to the steering handle shaft locking position, a restricting pin reciprocable between said holding position and an inoperative position included in said holding means and biased to said inoperative position, and a stopper for cooperation with said restricting pin provided on said lock releasing member, said maintaining means including a press lever disposed on a bracket fixed to the housing in a manner to be rotatable about a pivot thereof and having one end in contact with an end of the restricting pin and the other end connected with an end of an operating wire by means of a clamp, said operating wire having an end member at its other end, a compression coil spring in contact with said end member and urging same and said wire in a direction such that said one end of said press lever retains said restricting pin in said holding position, and a press member attached to a portion of a shift lever of said automobile and operably associated with said end member, said press member being operable to move said end member against the extensible force of said spring to permit rotation of said press lever about said pivot and movement of said restricting pin to said inoperative position under its bias when the shift lever is moved to a parking position.

* * * * *